United States Patent [19]
Adler et al.

[11] Patent Number: 5,923,863
[45] Date of Patent: Jul. 13, 1999

[54] SOFTWARE MECHANISM FOR ACCURATELY HANDLING EXCEPTIONS GENERATED BY INSTRUCTIONS SCHEDULED SPECULATIVELY DUE TO BRANCH ELIMINATION

[75] Inventors: Michael C. Adler, Lexington; Steven O. Hobbs, Westford; Paul Geoffrey Lowney, Concord, all of Mass.

[73] Assignee: Digital Equipment Corporation, Maynard, Mass.

[21] Appl. No.: 08/548,114

[22] Filed: Oct. 25, 1995

Related U.S. Application Data

[62] Division of application No. 08/270,192, Jul. 1, 1994.
[51] Int. Cl.$^6$ ........................................ G06F 9/38
[52] U.S. Cl. ............................. 395/392; 712/234
[58] Field of Search ............................. 395/392, 581

[56] References Cited

U.S. PATENT DOCUMENTS

| | | | |
|---|---|---|---|
| 5,193,158 | 3/1993 | Kinney et al. | 395/591 |
| 5,265,213 | 11/1993 | Weiser et al. | 395/587 |
| 5,420,990 | 5/1995 | McKeen et al. | 395/392 |
| 5,421,022 | 5/1995 | McKeen et al. | 395/800 |
| 5,428,807 | 6/1995 | McKeen et al. | 395/392 |

*Primary Examiner*—Krisna Lim
*Attorney, Agent, or Firm*—Arthur W. Fisher; Ronald C. Hudgens; Diane C. Drozenski

[57] ABSTRACT

Methods for handling exceptions caused by speculatively scheduled instructions or predicated instructions executed within a computer program are described. The method for speculatively scheduled instructions includes checking at a commit point of a speculatively scheduled instruction, a semaphore associated with the speculatively scheduled instruction and branching to an error handling routine if the semaphore is set. A set semaphore indicates that an exception occurred when the speculatively scheduled instruction was executed. For a predicated instruction the method includes checking a predicate of an eliminated branch and a semaphore associated with the speculative instruction at a commit point of the speculative instruction and branching to an error handling routine if the semaphore indicates that an exception occurred when said speculative instruction was executed, and the predicate is true, which indicates that said speculative instruction was properly executed.

8 Claims, 10 Drawing Sheets

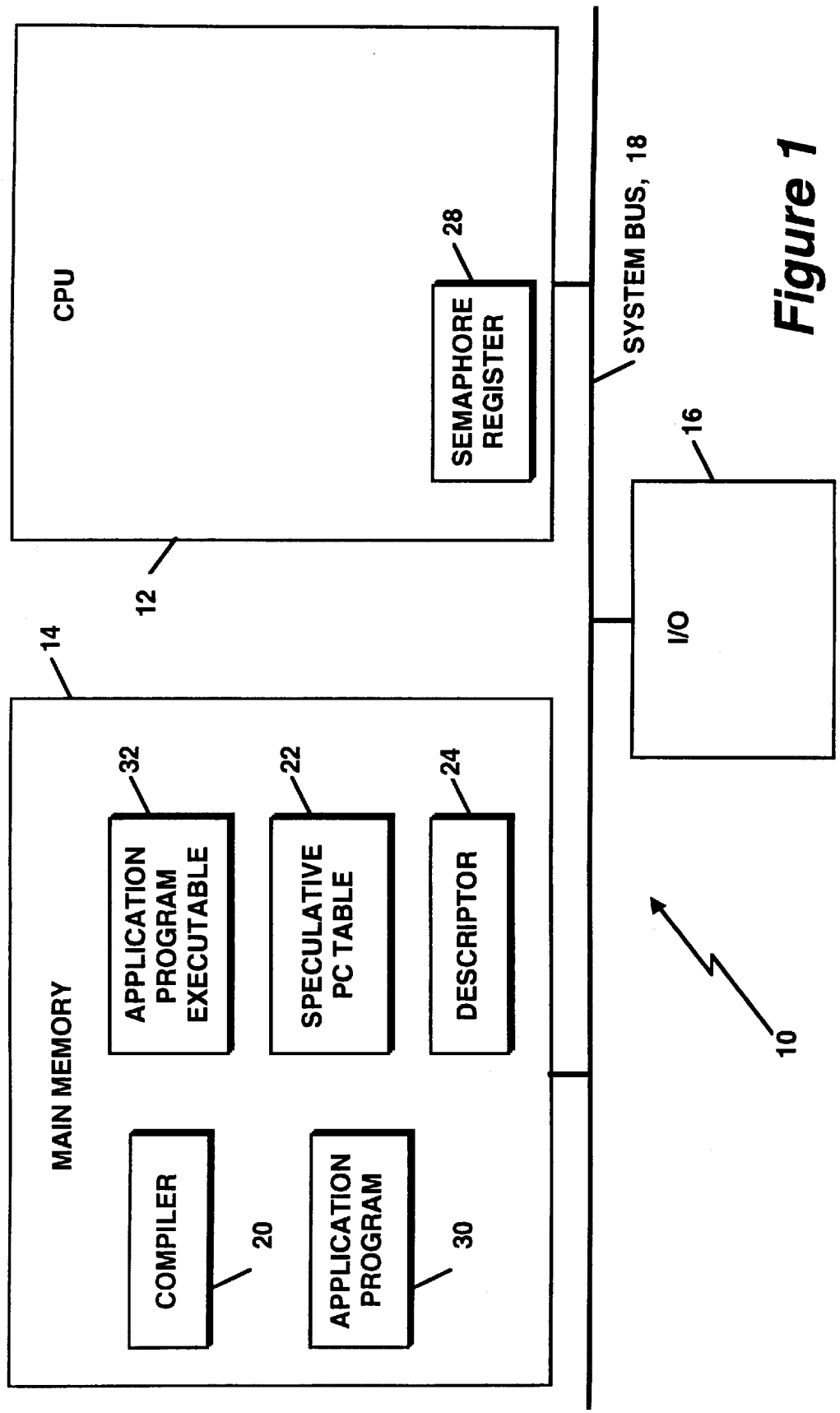

SOFTWARE MECHANISM FOR ACCURATELY HANDLING EXCEPTIONS GENERATED BY INSTRUCTIONS SCHEDULED SPECULATIVELY DUE TO BRANCH ELIMINATION

This is a divisional of copending application Ser. No. 08/270,192 filed on Jul. 1, 1994.

BACKGROUND OF THE INVENTION

This invention relates generally to language translators such as source code compilers and more particularly to translators or source code compilers which reschedule instructions.

As is known in the art, computer language translators such as compilers or assemblers convert a high level language or assembly code into a target language such as machine code which can be used to provide an executable version of a program. In particular, compilers convert high level language computer programs into machine language. That is, a compiler written for a particular high level language and computer converts the particular high level language into a machine language which is specific to the computer, whether that computer is the one on which the compiler resides or another machine.

Because compilers are written with specific hardware systems in mind, many are written to optimize the compiled code such that the compiled code takes advantage of the opportunities presented as a result of the configuration of the computer hardware. For example, in pipelined computer systems and multi-issue machines (super-scalar and very-long-instruction-word computer systems), there are often unused instruction issue slots as a result of data dependencies and resource conflicts between instructions. That is, unused issue slots occur because many instructions take more than one cycle to complete or because data and control dependencies and resource conflicts arise. Thus, while the system is waiting for an instruction to complete it is desirable to make more efficient use of the processor to issue other instructions. One approach which takes advantage of this situation involves rescheduling the order of the computer program instructions at compile time. In this way, a rescheduled instruction may be issued in a slot left empty by a prior instruction.

Typically, compilers break instructions into groups called basic blocks when identifying instructions to reschedule. All instructions in a basic block share the same control dependence. That is, these basic blocks of code have a single entry point and are typically guaranteed to execute all instructions within the block once the block has been entered.

As computers have become capable of executing an increasing number of instructions at a time, these short blocks of code do not provide enough instructions which may be rescheduled to make use of all available issue slots. In order to make additional instructions available for rescheduling, an approach has been developed called "speculative scheduling" which reschedules instructions and places them before branches on which they are control dependent. As a result, a speculatively scheduled instruction is executed before it is known whether it should be executed; that is whether in the logical flow of the program, it would have executed had it not been rescheduled. A speculatively scheduled instruction is called "mispredicted" after it is executed if it is determined that the instruction should not have executed due to a controlling branch taking an unpredicted direction.

During execution of an instruction an exception is raised if the input data to the instruction is invalid. In current implementations, if an instruction was "speculatively scheduled" and therefore "speculatively executed" and the instruction was speculatively scheduled by a compiler or other software mechanism, the exception is generally ignored. On the other hand, if the instruction was speculatively scheduled by hardware, often times the hardware will have circuits which allow the exception to be processed such that the processor can undo errant transactions. If it is shown that an instruction was "mispredicted" (i.e., that it should not have executed) then the exception should be ignored.

As mentioned above, both hardware and software techniques have been developed for speculatively executing instructions. Using a hardware technique, it is expected that the hardware will undo all side effects of mispredicted instructions and that no exception caused by a speculatively scheduled instruction will be raised until it is shown that the instruction was predicted correctly.

One problem with software techniques for speculatively scheduling instructions is that these techniques generally do not have the capability to defer exceptions caused by speculatively scheduled instructions. Therefore, software techniques either confine rescheduling to instructions that cannot generate an exception (i.e. those instructions which, due to hardware constraints, are incapable of raising an exception) or ignore all exceptions that might be generated by speculatively scheduled instructions. As a result, the benefits presently available through software techniques which speculatively schedule instructions are limited. As mentioned above, those software techniques that do attempt to reschedule instructions capable of generating exceptions typically ignore all exceptions whether the instructions are mispredicted or not.

An alternate method available to increase the number of instructions available for rescheduling is through a process called branch elimination. Branch elimination rewrites a program to preserve its original semantics using straight line code as a replacement for the conditional code found within the program. Two general classes of branch elimination may be identified, so called "hardware predication" and so called "select".

The technique referred to as "hardware predication" eliminates a branch by applying the condition expressed by a branch as a predicate to each instruction controlled by the branch. Included as part of the encoding of each instruction formerly controlled by the eliminated branch, is the location of the instruction's associated predicate which is a boolean that was formerly tested by the eliminated branch.

The "select" option of branch elimination is a combined hardware and software approach. In many computer system hardware architectures, instructions are composed of an op-code portion, two source register operand portions and a destination register operand portion. The source and destination operands serve as pointers to a general purpose register file in the processor. A "select" operation uses three inputs for source register operands: two possible input values and a predicate. The "select" operation chooses between the two input values based upon the value of the predicate. Because most architectures allocate only two source operands per instruction and a "select" operation requires three, two instructions are required on these architectures to perform a select operation: a copy instruction followed by a conditional copy instruction. The combination of the two instructions makes it possible to select between two inputs by copying a first input value to the destination and conditionally moving a second input value to the same destination.

When a "select" operation is used to eliminate branches, the instructions controlled by a branch must be executed unconditionally. As a result, these instructions may be executed before it is determined whether they would have executed in a normal encoding of the program. Therefore, these instructions are speculatively executed. As mentioned above, during execution of instructions controlled by a branch an exception may arise if the input data to the instruction is invalid.

Systems which employ "hardware predication" are generally capable of preventing side effects caused by mispredicted instructions. Generally, the hardware will include circuits which allow the exception to be processed such that the processor can undo errant transactions. Those systems which employ "select" operations, however, are not capable of preventing such side effects and are therefore usually either limited to selecting instructions which will not cause exceptions or ignoring all exceptions that may be generated by predicated instructions.

SUMMARY OF THE INVENTION

In accordance with the present invention, a method for handling an exception caused by a speculative instruction provided for an eliminated conditional branch, the speculative instruction being executed within a computer program includes the steps of checking a predicate of the eliminated branch and a semaphore associated with the speculative instruction and branching to an error handling routine if the predicate indicates that the speculative instruction should have executed and the semaphore indicates that an exception occurred when the speculative instruction was executed. With such an arrangement, a technique is provided to defer the handling of exceptions caused by speculative instructions. By branching to an error handling routine only if the predicate indicates that the speculative instruction should have executed and the semaphore indicates that an exception occurred when the speculative instruction was executed only exceptions caused by speculative instructions which should have executed are reported. That is, those exceptions which arise from instructions which should not have executed are properly ignored since the predicate would indicate that the instruction should not have executed and control would therefore not branch to the error handling routine.

In accordance with a further aspect of the present invention, a computer language translator which eliminates conditional branches in a computer program includes means for translating a program into a target language and means for replacing a conditional branch instruction by replacing an instruction dependent upon the conditional branch instruction with a combination of a predicated instruction and a speculative instruction. The translator further includes means for associating a semaphore with the speculative instruction. With such an arrangement, by associating a semaphore with a speculative instruction the nature of the instruction, i.e. whether an instruction was speculative or non-speculative, is provided within an executable image of the translated program.

In accordance with a still further aspect of the present invention, the translator includes means for including in an executable image of the program, instructions to test the semaphore and to test the branch predicate. With such an arrangement, a run-time system executing the executable image of the program is able to test a semaphore associated with a speculative instruction and determine whether an exception occurred when the speculative instruction was executed by the run-time system. By testing both the predicate of the conditional branch as well as the semaphore associated with the speculative instruction exceptions caused by such instructions can be properly handled. That is, exceptions which arise from instructions which should not have executed are properly ignored since the predicate of the corresponding eliminated branch instruction would indicate that the instruction should not have executed. On the other hand, for those instructions whose predicate indicates that the instruction should have executed, the semaphore can be tested so that the exception can be handled at the proper point in the execution of the program.

BRIEF DESCRIPTION OF THE DRAWINGS

The above-mentioned and other features of the invention will now become more apparent by reference to the following description taken in connection with the accompanying drawings in which:

FIG. 1 is a block diagram of a computer system used to execute a compiler on an application program and to execute an executable application program;

DESCRIPTION OF THE PREFERRED EMBODIMENTS

Figure 1A:
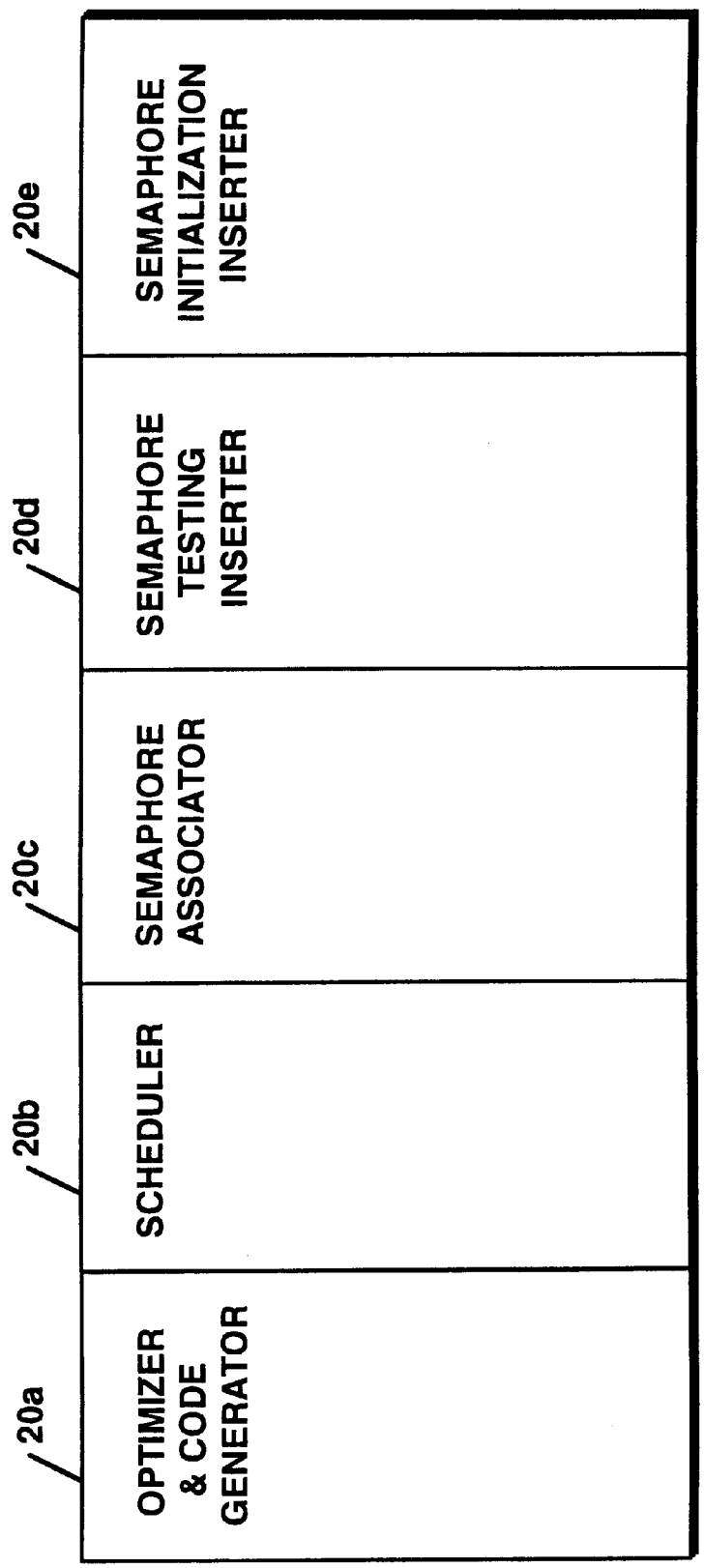
FIG. 1A is a block diagram of the compiler depicted in FIG. 1.

Referring to FIG. 1, a computer system 10 is shown to include a CPU 12, a memory 14, an I/O bus adapter 16, and a bus 18 interconnecting the CPU 12, memory 14 and I/O bus adapter 16. In general, FIG. 1 is a simplified representation of any suitable computer system on which a language translator, such as here a high level computer language compiler, may be run. Language translators such as compilers and assemblers convert computer programs written in a high level language or an assembly language into a target language. The memory 14 contains the executable code of a compiler 20.

The compiler 20 is run in the computer system 10 within the CPU 12 which uses the available memory 14. While executing within the CPU 12, the compiler 20 produces various data structures which contain information that can be used by an application program to handle exceptions caused by instructions, in particular, those which were speculatively scheduled by the compiler. The data structures produced include a speculative PC table 22, a descriptor 24, and a semaphore register 28 comprising a plurality of bits. Each of these data structures will be discussed in conjunction with FIG. 2.

Also located in memory 14 is the application program which is to be compiled by the compiler 20. As discussed above, the compiler 20 produces the data structures mentioned above 22, 24, 28 while compiling the application program.

Using an assumed load address, the compiler 20 produces the speculative PC table 22 and loads program counter values for blocks of speculatively scheduled instructions into the program counter field 22a of the speculative PC table, relative to the assumed load address. Once the application program is linked, the linker relocates the program to the actual address space in which the program will execute and adjusts the program counter values accordingly.

While compiling the application program the compiler will search for suitable instructions for rescheduling. When the compiler 20 selects an instruction to schedule speculatively, it checks to see if one of the plurality of bits, such as bit 28a, is available in the semaphore register 28 and allocates the available bit to the instruction by placing the bit number of the available bit in field 24b, as will be described. If the compiler 20 is unable to locate an available bit the instruction is not rescheduled.

When the compiler does locate an available bit the data structures which have been produced by the compiler 20 are then updated with the information necessary to associate the program counter value of the instruction to the bit allocated to the speculatively scheduled instruction. This entails reserving a location in memory as a descriptor and depositing the address of the location of the descriptor 24 into the pointer field 22b of the speculative PC table 22. Having located an available bit as mentioned above, the bit number of the bit located by the compiler is deposited into the second four bits of the descriptor 24 while the first four bits are used to define the offset of the instruction from the program counter value used in the speculative PC table. The application program uses the data structures discussed 22, 24, 28 to locate and set a bit in the semaphore register should a speculatively scheduled instruction cause an exception while executing.

As the compiler 20 is compiling the program it determines the commit point of each instruction it schedules speculatively. The commit point is the point at which it is known whether the speculatively scheduled instruction would have executed in a non-speculative encoding of the program. This point can be the point at which the speculatively schedule instruction would have executed had it not been rescheduled. It is also possible for the commit point of a speculatively scheduled instruction to be at another point in the executable at which it is known that the speculatively scheduled instruction would have executed.

In the executable code after this commit point the compiler 20 inserts instructions to test the semaphore associated with the speculatively scheduled instruction to determine whether an exception occurred during execution of the speculatively scheduled instruction. These test instructions access the semaphore bit associated with the particular speculatively scheduled instruction and determine whether the bit was set. If the bit was set, signifying that an exception occurred when the speculatively scheduled instruction was executed, the test instructions instruct the run-time system to branch to an error handling routine. If the bit was not set this signifies that no exception occurred during execution of the speculatively scheduled instruction and the application program continues executing normally.

Testing the semaphore bit 28a after the commit point of the speculatively scheduled instruction has been reached facilitates ignoring exceptions caused by "mispredicted" instructions. If the speculatively scheduled instruction should not have executed then the commit point is not reached. Accordingly, the test is not performed, the semaphore bit 28a is not checked, and thus, any exception that occurred during execution of the speculatively scheduled instruction is properly ignored.

Also shown in FIG. 1 is application program executable 32 which was the result of compiler 20 compiling application program 30. The computer system of FIG. 1 is also a simplified representation of any suitable computer system on which the resultant application program executable 32 may be run. Although FIG. 1 depicts the application program executable 32 to be resident on the same computer system 10 on which compiler 20 resides as well as application program 30 resides, it should be obvious to one skilled in the art that such an arrangement is not required. That is, compiler 20 may also compile high level language computer programs to provide executable files to run on computer systems other than the computer system on which compiler 20 resides.

Referring now to FIG. 1A, compiler 20 includes an optimizer and code generator 20a which is used to convert a program written in a high-level computer language to an executable program written in machine code. The compiler 20 also includes an instruction scheduler 20b which reorders the computer program instructions in an order which takes advantage of unused processor issue cycles.

The compiler 20 further includes a semaphore associator 20c which is used to associate a semaphore with each instruction which has been speculatively scheduled by the instruction scheduler 20b. This associator 20c provides the program a location in a semaphore register in which to note the occurrence of an exception caused by the execution of the associated, reordered instruction.

The compiler 20 further includes a semaphore initialization inserter 20e which allows the compiler 20 to provide additional instructions to the executable image of the program to allow the program to clear or otherwise initialize the semaphore associated with a speculatively scheduled instruction. These instructions which clear the semaphore are inserted so that they execute prior to the execution of the speculatively scheduled instruction.

The compiler 20 further includes a semaphore test inserter 20d which allows the compiler to provide additional instructions to the executable image of the program to allow the program to test the semaphore to determine whether an exception occurred when the reordered instruction was executed.

Figure 2:
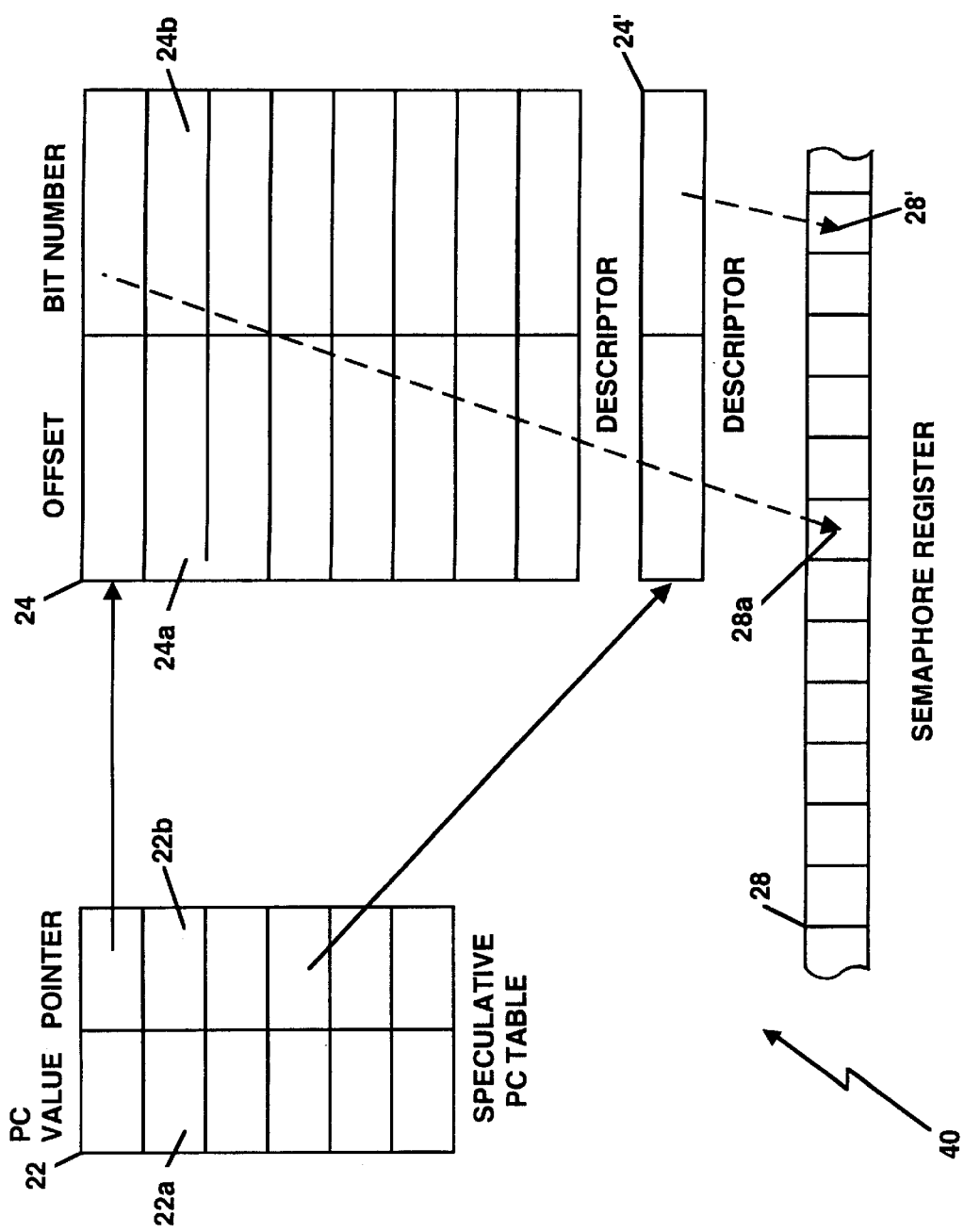
FIG. 2 is a pictorial representation of data structures used to associate a speculative instruction with a corresponding semaphore.

Referring now to FIG. 2, a speculative PC table 22 is shown as a two-dimensional array data structure resident in a portion of main memory 16 (FIG. 1). Here, the speculative PC table 22 includes a field for a program counter value 22a and a field for a pointer 22b which provides an address to a corresponding descriptor data structure. Each pointer 22b in the speculative PC table 22 corresponds to an entry in the program counter value field 22a. Thus, for each program counter value in the table there is a corresponding descriptor in memory. The speculative PC table 22 is used to associate a position of a speculative instruction (by program counter value) with the location of a corresponding semaphore.

Thus, the first entry in the array is the program counter value 22a and the second entry is the pointer 22b to the descriptor 24. The elements of the array, which are the entry pairs, are ordered by ascending value of the program counter value 22a entries. Here, the descriptor 24 is a series of zero terminated eight bit bytes. The first four bits of the eight bit byte 24a represent the instruction displacement from the program counter in the speculative PC table 22. The remaining four bits of the eight bit byte 24b represent a bit 28a within the semaphore register 28. The semaphore register 28 is an entire general purpose register which is used by the application program to signal that an exception occurred during execution of a speculatively scheduled instruction. The individual bits within the semaphore register 28 are used to provide multiple, independent semaphores with each semaphore bit 28a being associated with one or more speculatively scheduled instructions.

Figure 3:
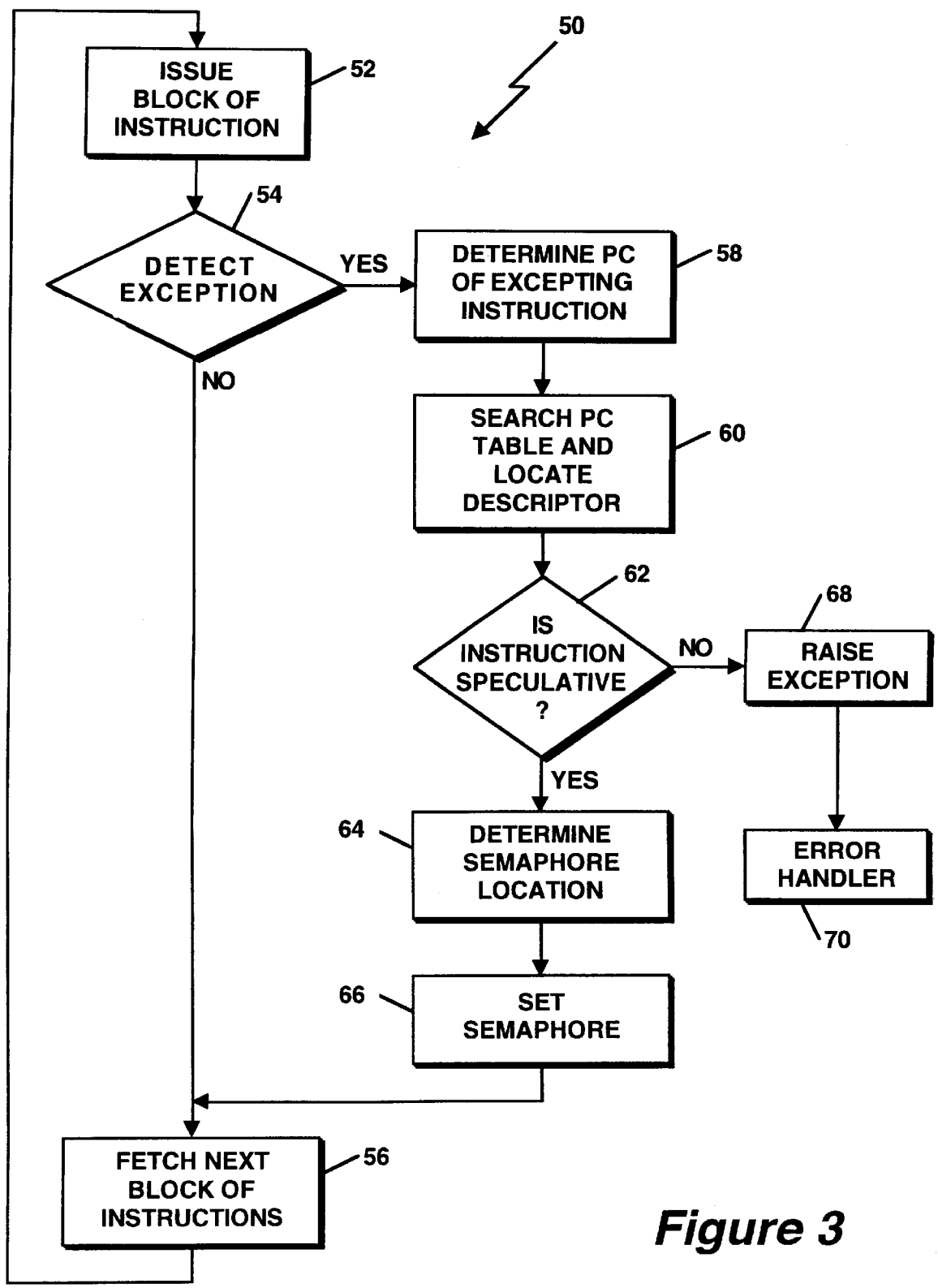
FIG. 3 is a flow chart depicting steps used to handle exceptions caused by an executed instruction.

Referring now to FIG. 3, the executable version of the application program 32 is run on computer system 10 (FIG. 1) under control of a run-time system as is known in the art. A flow 50 of the process used to execute instructions and handle exceptions is shown to include the step of executing a block of instructions (step 52) located within the executable on computer system 10. If the instructions execute without causing an exception, for which a check is performed at step 54, the next block of instructions is fetched at step 56 and is subsequently executed at step 52. If one of the instructions executing at step 52 causes an exception which is detected at step 54, the flow branches to step 58.

At step 58, the program counter value of the excepting instruction is determined by the run-time system. The program counter value is used in a binary search of the speculative PC table 22. Using the program counter value field in the speculative PC table a search is conducted at step 60 to find a program counter entry which is less than or equal to the program counter value of the faulting instruction. The pointer value corresponding to the program counter value selected is used to determine the descriptor at step 60 which identifies the bit number of the semaphore associated with the instruction if it is speculatively scheduled.

Once a descriptor is identified, the offset between the program counter value of the instruction and the program counter value identified in the speculative PC table is compared to the offset field of each byte in the descriptor identified at step 62 until a match is found. If no match is found the run-time system is able to determine that the instruction was not speculative and the flow branches to step 68. At step 68, the exception is immediately raised by the run-time system and control is transferred to the error handling routine at step 70.

Should the offset field contain a corresponding record the remaining four bits of the descriptor are read to determine the location of the associated semaphore bit in the semaphore register at step 64. The semaphore register is accessed, the appropriate bit is set at step 66, and control is returned to the main program which fetches the next block of instructions at step 56.

As would be known to one skilled in the art there are numerous methods which would enable the association of a speculative instruction to a semaphore. An alternate embodiment to the method described above could use a hash table.

To implement the use of a hash table, a section of memory is allocated which is typically twice as large as the number of instructions in the program. The memory allocated is organized into a two-dimensional array structure in which the first field in the array represents the program counter value of an instruction. At allocation time, each entry in the first field of the array is initialized to zero. The second field in the array represents the bit number of the bit within the semaphore register allocated to the instruction.

As an instruction is selected for rescheduling, the instruction's program counter value is entered into the first field of the hash table's two-dimensional array and its associated bit value is entered into the second field. The location in the hash table at which the information is entered is based upon a value of the low order bits of the instruction's program counter value. An integer equivalent of the value of the low order bits is used as an offset from the beginning of the hash table to determine the entry in the hash table at which the information will be entered.

That is, if the low order bits of the instruction's PC value have an integer equivalent of 52, then the information is entered at the 52nd entry in the hash table, assuming this entry is empty. The instruction's PC value is entered into the first field of the hash table at entry 52 and the bit number of the selected, available bit in the semaphore register is entered into the second field of the hash table entry 52. Each instruction which is speculatively scheduled is entered into the array in this manner.

If a subsequent speculative instruction also has a low order bit portion of its PC value which has an integer value equivalent of 52, the compiler would find that the 52nd entry in the hash table was taken. Accordingly, the compiler would enter the PC value of the subsequent speculative instruction into the first is available entry location following the 52nd entry.

To access the hash table and determine if a semaphore bit was associated with an excepting instruction when the application program is executing, the low order bit portion of the PC value of the excepting instruction is determined and the hash table is first accessed at that entry. Using the example set forth in the above paragraph where the low order bit portion of the PC value had an integer value of 52, the hash table is accessed first at entry 52.

Starting at the 52nd entry, a comparison is made between the excepting instruction's PC value and the contents of the PC field of the hash table. If no match is provided, the contents of the PC field of the 53rd entry and subsequent entries are compared to the PC value of the excepting instruction until either a match is provided or a zero is encountered. If a match is provided, indicating that the instruction was executed speculatively, the bit number is read to determine the location of the associated semaphore. The semaphore register is accessed and the semaphore bit is set to indicate that an exception occurred when the instruction was executed. If no match is provided before a zero is encountered, the zero entry in the PC field of the hash table indicating that no further entries are available in the range of the integer value of the low order bits portion of the excepting instruction's pc value, then the instruction is not speculative and the exception is handled immediately.

A person skilled in the art would now realize that other methods could be used to associate a speculative instruction with a semaphore. Such methods could use linked lists, binary trees, and other variations of hash tables and so forth.

Figure 4:
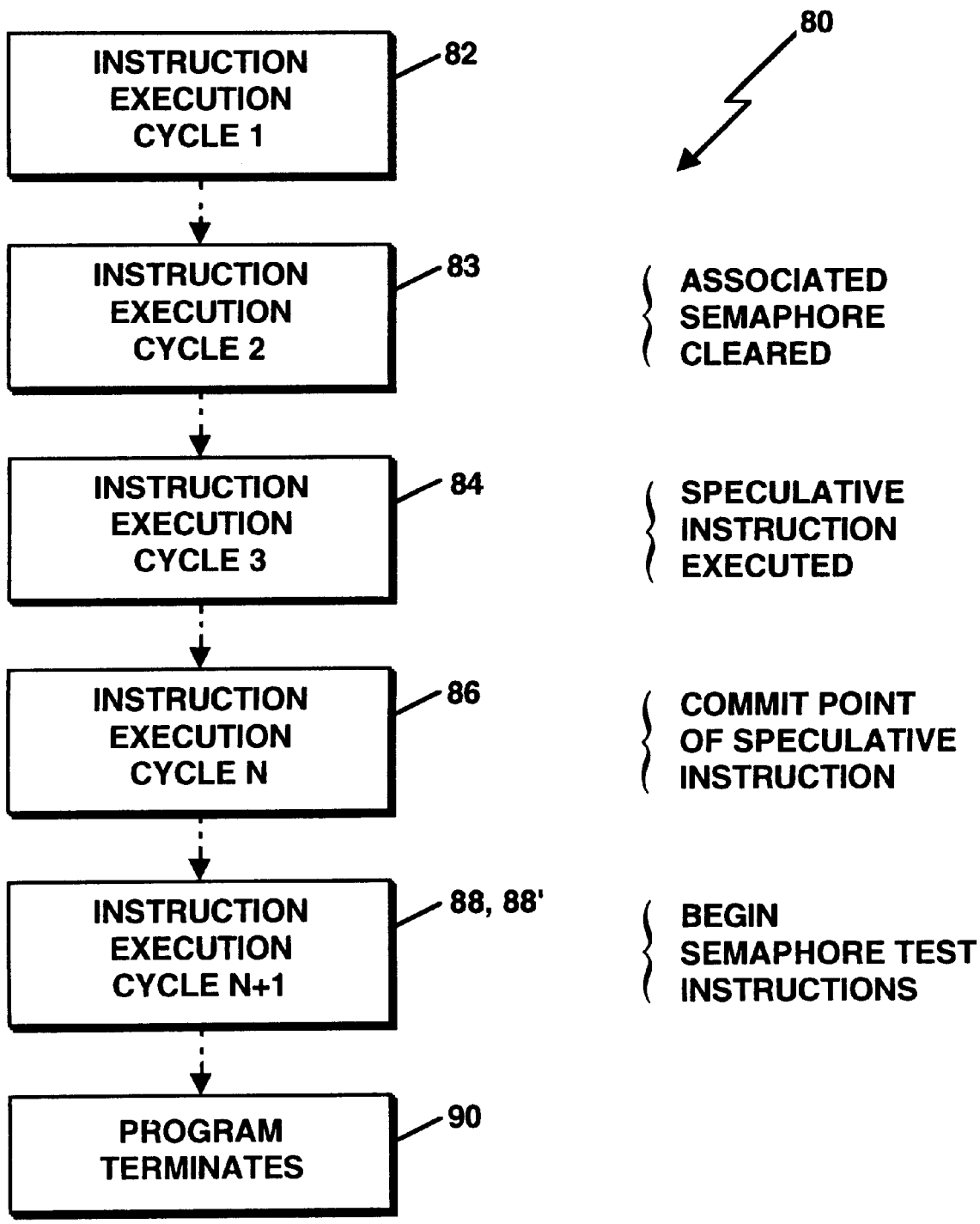
FIG. 4 is a diagram depicting an example flow using the steps of FIG. 3 on each instruction of a compiled application program.

Referring now to FIG. 4, an illustrative flow of a computer program is shown. As will be discussed, it is assumed that a speculative instruction, when executed at step 84, causes an exception and that the commit point of the excepting instruction is reached at step 86. As shown in this example, the speculative instruction causes an exception when executed. It should be noted, however, that most speculatively scheduled instructions execute without causing an exception. In addition, in the instance of a "mispredicted" instruction, the commit point of the instruction would not be reached.

Flow 80 shows the process set forth in conjunction with FIG. 3 with an instruction execution cycle occurring for each instruction executed in the application program. At instruction execution cycle 1 at step 82, the instruction executes without generating an exception. At instruction execution cycle 2 at step 83, an instruction is executed which clears the semaphore associated with the speculative instruction which is to be executed at step 84. Clearing semaphores will be further discussed in conjunction with FIG. 6. During instruction execution cycle 3 at step 84, a speculative instruction is executed, causing an exception. Following the process discussed in conjunction with FIG. 3, the semaphore associated with this instruction is set.

Numerous intervening instructions are executed and in the Nth instruction execution cycle at step 86, the commit point of the instruction executed in the third instruction execution cycle is reached. That is, an instruction is executed after which it can be determined whether the instruction executed in instruction execution cycle 3 should have executed. This third instruction cycle is executed as outlined in conjunction with the discussion of FIG. 3.

At step 88, the instructions inserted by the compiler to test the semaphore associated with the instruction of instruction cycle 3 are executed. Here, the associated semaphore is checked, and if it is set (which means an exception occurred during execution of the associated instruction), control is passed to an error handler. If the associated semaphore is not set then no exception occurred during the execution of the instruction, and the application program continues executing until the application program terminates at step 90. Here, the test of the semaphore is shown to immediately follow the commit point of the speculative instruction. This, however, is not a requirement. The only requirement is that the semaphore be tested sometime after the commit point has been reached as will be discussed in conjunction with FIG. 5B.

As discussed above, the commit point is the point at which it is known whether the speculatively scheduled instruction would have executed in a non-speculative encoding of the program. The test of the semaphore may be performed at the point at which the speculatively scheduled instruction would have executed had it not been rescheduled. The test may also be performed at a point in the program sharing the same control dependence as the point immediately following the commit point. Namely, any point at which it is known that the speculatively scheduled instruction would have executed.

Figure 5B:
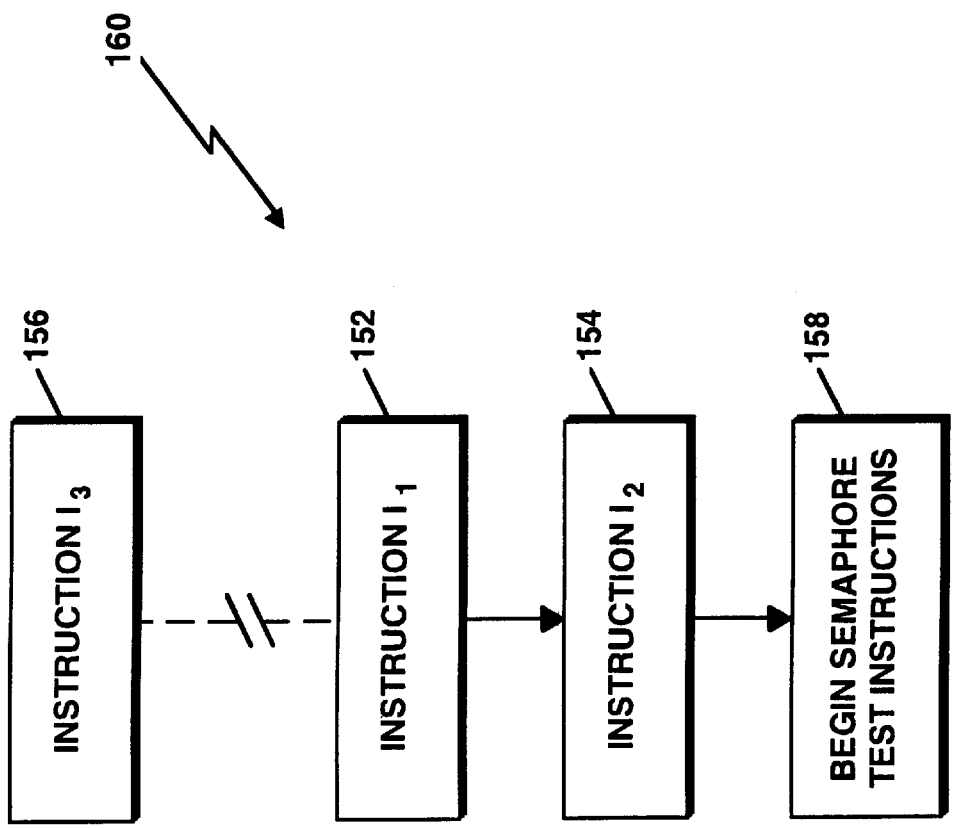
FIG. 5B is a diagram depicting the order of the instructions from FIG. 5A after the computer program has been reordered by a scheduler as well as the location at which the compiler inserts semaphore test instructions.
Figure 5A:
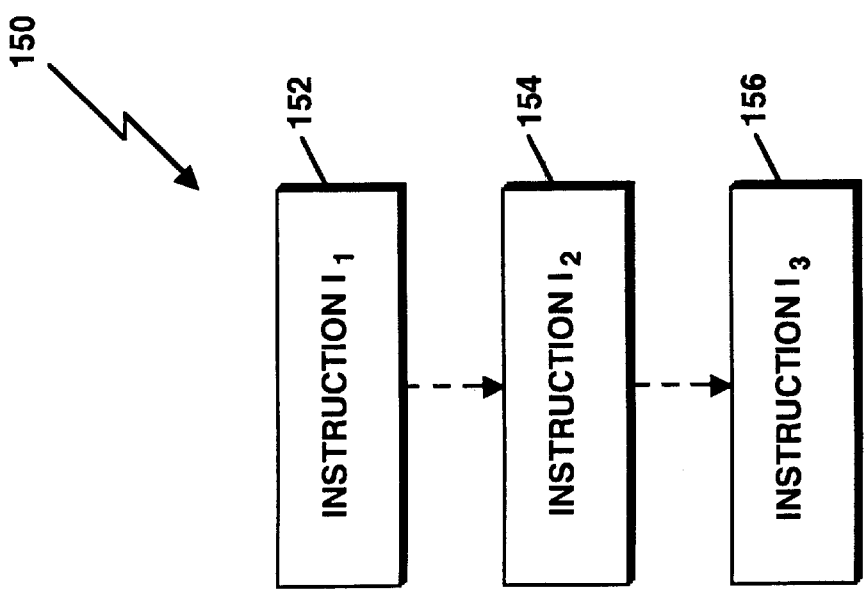
FIG. 5A is a diagram depicting the order of instructions as found in a computer program before the program has been reordered by a scheduler.

Referring now to FIG. 5A, an ordering 150 of the instructions of the application program 32 (FIG. 1) is shown prior to the application program being rescheduled by the scheduler portion 20b (FIG. 1A) of the compiler 20 (FIG. 1). This depicts the original encoding of the application program 32. As shown, instruction $I_1$ 152 is followed immediately by instruction $I_2$ 154 which is followed by instruction $I_3$ 156. In this example, instructions $I_1$, $I_2$ and $I_3$ 152, 154, 156 are referred to as a basic block of instructions. A basic block of instructions, as described above, is a block of instructions where, once the block has been entered, all instructions are generally guaranteed to execute. Therefore, once instruction $I_1$ 152 has executed it is known that instructions $I_2$ 154 and $I_3$ 156 will also execute.

Referring now to FIG. 5B, a reordering 160 of the instructions of the application program 32 (FIG. 1) is shown. This reordered version of the program is the result of the scheduler 20b portion of the compiler 32 rescheduling portions of the program in order to take advantage of unused issue slots.

As shown, instruction $I_3$ 156 has been rescheduled by the scheduler 20b to execute before instructions $I_1$ and $I_2$ 152, 154. Instruction $I_3$ 156 is scheduled to execute at some period before $I_1$ 152 such that it is possible, in the flow of the program, that the instruction block beginning with instruction $I_1$ 152 is never reached.

In this simplified example, instruction $I_2$ 154 is said to be the commit point of instruction $I_3$ 156 in that if instruction $I_2$ 154 executes then it is known that instruction $I_3$ 156 should also execute. Because instruction $I_3$ 156 has been scheduled before instruction $I_2$ 154, instruction $I_3$ has been speculatively scheduled. That is, until instruction $I_2$ 154 executes it won't be known whether instruction $I_3$ 156 should have executed. Therefore, executing it before this point is speculating that instruction $I_3$ 156 would have executed.

As a result of this rescheduling, the compiler 20 inserts semaphore test instructions after the commit point of instruction $I_3$ 156 to test the semaphore associated with instruction $I_3$ 156 to determine whether an exception occurred when instruction $I_3$ was executed. Here, these test instructions 158 are inserted by the compiler after instruction $I_2$ 154.

An alternate commit point for instruction $I_3$ 156 in this example would be instruction $I_1$ 152. This is because instructions $I_1$, $I_2$ and $I_3$ 152, 154, 156 are a basic block of instructions and therefore, as discussed above, it is known once instruction $I_1$ 152 executes that instruction $I_3$ 156 would also execute. Accordingly, the semaphore test instructions 158 could also be inserted after instruction $I_1$ 152.

Figure 6:
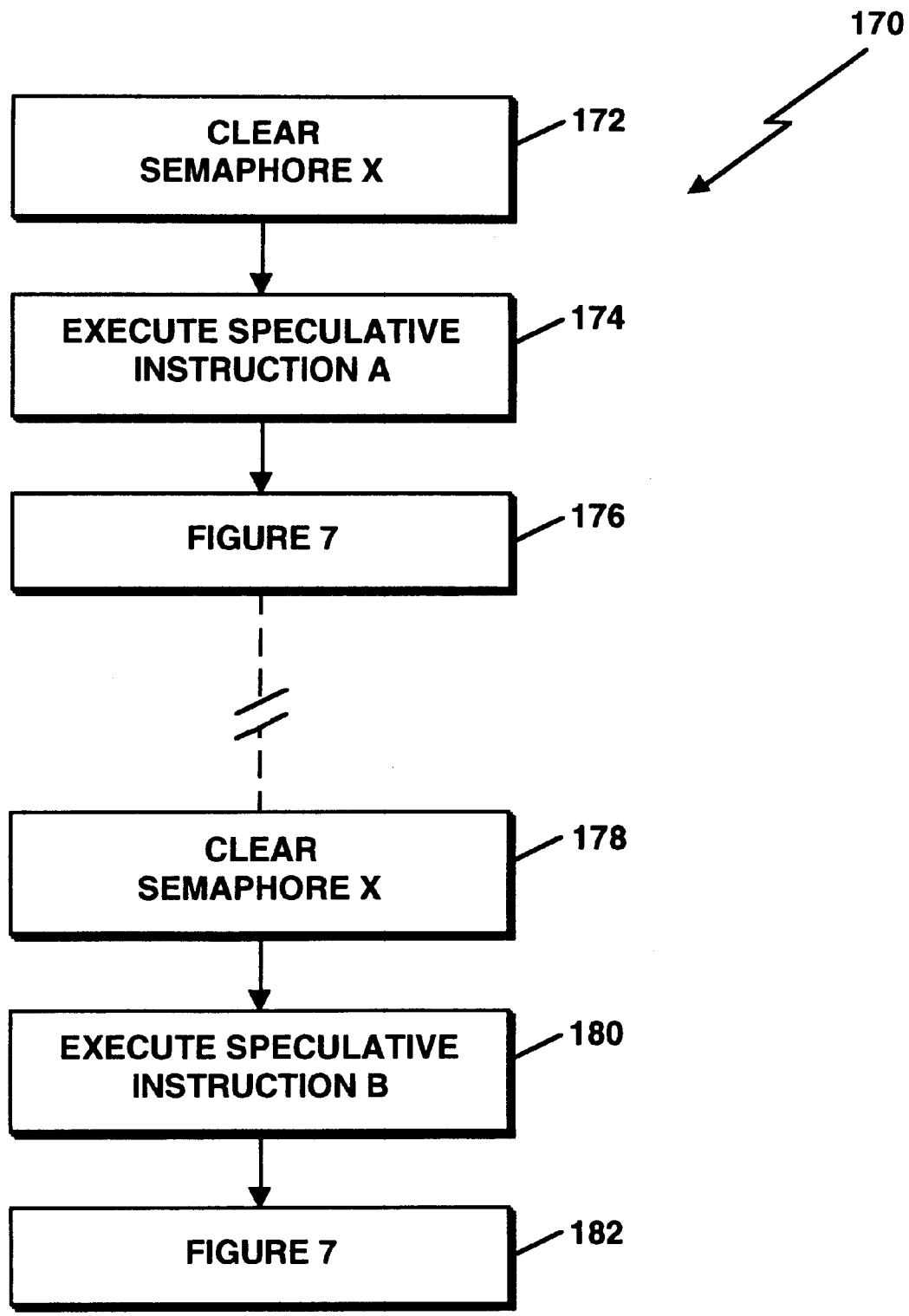
FIG. 6 is a diagram depicting the sharing of a semaphore bit as well as the location at which the compiler inserts an instruction to clear a semaphore bit.

Referring now to FIG. 6, when the compiler 20 (FIG. 1) selects an instruction to reschedule, it first locates an available bit in the semaphore register as discussed above. In its most simple embodiment, this enables compiler 20 to reschedule one instruction for each bit in the register allocated as a semaphore register by the compiler 20. Assuming the allocated register is a 64 bit register, only 64 instructions can be rescheduled. More than 64 instructions can be simultaneously speculatively scheduled if more than one register is allocated to the purpose of holding semaphore bits.

An alternate embodiment allows speculative instructions to share semaphores. Because more than one speculatively scheduled instruction may share the same commit point, it may be appropriate for some or all of the instructions sharing the common commit point to share a semaphore as well. If it is not necessary to know which instruction caused the exception then multiple instructions may share a common semaphore. If correspondence between an exception and the instruction which caused it is a requirement for the application then this implementation would not be appropriate.

An alternate procedure for sharing semaphores between instructions is depicted in flow 170. At step 172, compiler 20 (FIG. 1) inserts a clear semaphore instruction into the executable version of the application program, as will be discussed in detail later. This clear semaphore instruction clears semaphore bit x which is associated with speculative instruction A. Speculative instruction A is executed at step 174. At a later point during the execution of the program, the commit point of speculative instruction A is reached and semaphore bit x is checked, as will be discussed in conjunction with FIG. 7.

At step 178, the compiler inserted into the executable version of the application program an additional clear semaphore instruction. This clear instruction clears semaphore bit x which has been associated with speculative instruction B as well as speculative instruction A. Speculative instruction B is executed at step 180 and at step 182 at a later point in the execution of the application program, semaphore bit x is checked in accordance with the description which follows in conjunction with FIG. 7.

Both instruction A and instruction B are able to share a single semaphore because the compiler determined that after instruction A executed, instruction B would not execute until it was determined whether instruction A should have executed. That is, either the commit point of instruction A was reached or it was determined that instruction A was "mispredicted". Because it was determined that instruction A's use of the semaphore would never overlap instruction B's use of the semaphore, the two instructions are able to share a common semaphore.

As depicted in FIG. 6, it is important that a semaphore be cleared at an appropriate time in order for the semaphore to be set and tested properly. The semaphore associated with a speculative instruction should be cleared before the instruction is executed and may be modified only by the run-time handler between the point when the instruction is executed and the point at which either the commit point of the instruction is reached or when it is clear that the commit point will not be reached.

A simple approach which is depicted in FIG. 6 is to clear a semaphore just before the speculative instruction associated with the semaphore executes. Because instructions may share semaphores as discussed above, it is important that the semaphore not be automatically cleared before each instruction which has been associated with it. If a semaphore is cleared incorrectly an excepting instruction sharing a commit point with a non-excepting instruction may have its set semaphore cleared by the subsequent non-excepting instruction. Rather, for a single common commit point, a semaphore should be cleared once prior to the first speculative instruction executed which shares the common commit point.

At step 172, the compiler 20 (FIG. 1) inserts an instruction to clear semaphore bit x prior to speculative instruction A being executed at step 174. At step 178, the compiler 20 (FIG. 1) inserts an instruction to clear semaphore bit x again because speculative instruction B does not share a common commit point and therefore the semaphore bit is cleared before speculative instruction B is executed at step 180.

An alternate method of clearing a semaphore requires the compiler 20 to use flow analysis on the application program. Instances in the flow of the program are identified when there would be no uncommitted instruction outstanding during execution. At this point in the program, the compiler 20 inserts an instruction which clears the entire register at once. One skilled in the art could also use flow analysis to locate points in the program where a subset of the semaphore bits could be cleared safely as a group.

Figure 7:
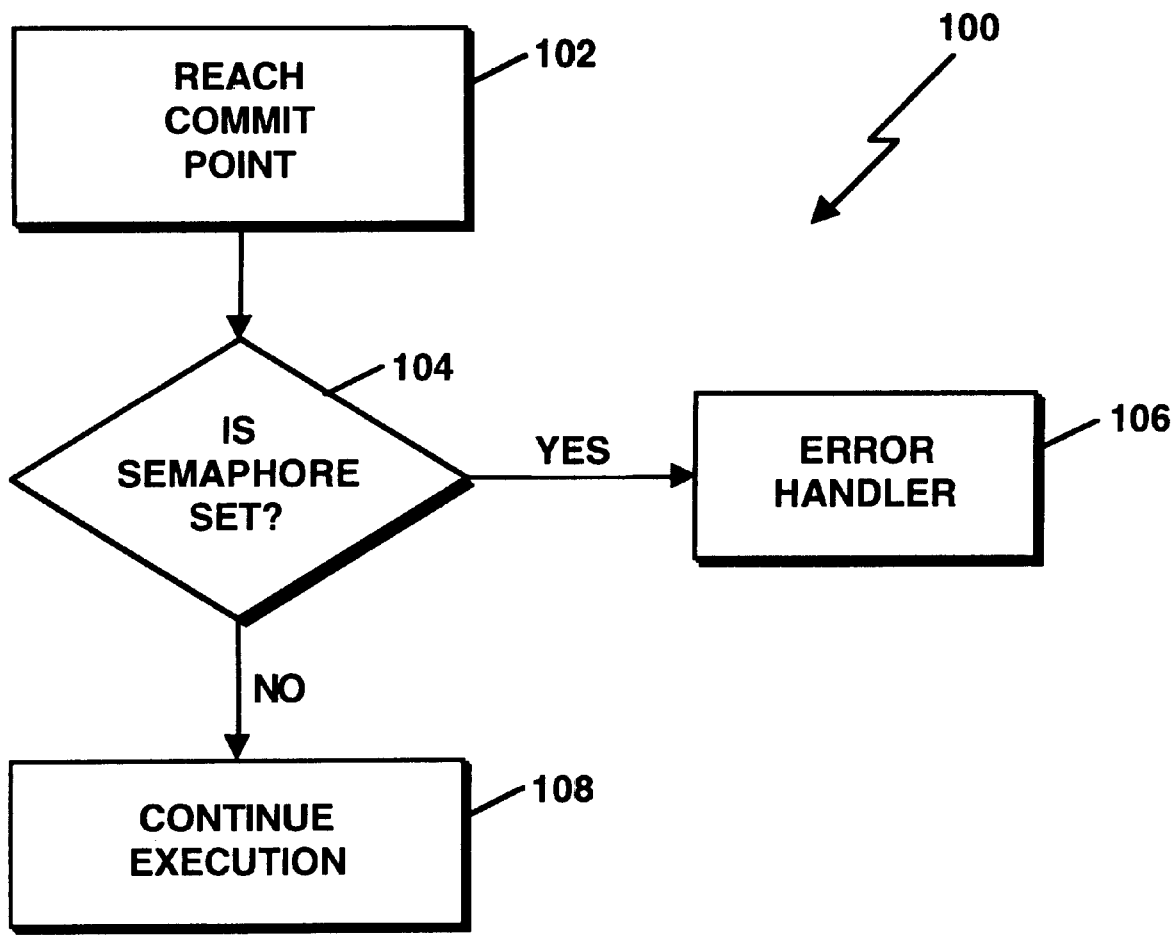
FIG. 7 is a flow chart depicting the steps taken by a run-time system following a commit point of a speculatively scheduled instruction.

Referring now to FIG. 7, the test of a semaphore, as shown in flow 100, begins once the commit point of a speculatively scheduled instruction has been reached at step 102. Because the commit point has been reached, it is known that the speculatively scheduled instruction would have executed in a non-speculative encoding of the program.

At step 104, the associated semaphore is checked to determine whether an exception occurred when the speculatively scheduled instruction executed. The instructions inserted by the compiler to test the semaphore include the bit number of the associated semaphore. To check the semaphore at step 104, the semaphore register is accessed and the associated bit is read. If the bit is set, signifying that an exception occurred when the speculatively scheduled instruction executed, then control is passed to an error handler at step 106. If the bit is not set, the speculatively scheduled instruction executed without causing an exception, and execution of the program is continued at step 108 by proceeding on with the normal flow of the application program.

If the speculatively scheduled instruction should not have executed, that is, the commit point of the instruction is never reached, then the semaphore test instructions inserted by the compiler are not executed and any exception which may have been caused by the "mispredicted" instruction is properly ignored.

Referring back to FIG. 3, the procedure followed for predicated instructions is similar to that followed for speculatively scheduled instructions. At step 52, a block of instructions within the executable version of the application program 32 (FIG. 1) is executed. Should an instruction executed cause an exception at step 54, the flow branches to steps 58–70, setting a semaphore bit at step 66 if the instruction was found to be speculative (i.e. a predicated instruction resulting from the elimination of a branch) at step 64, or raising the exception at step 68 if the instruction was not found to be speculative. At step 56, the next block of instructions is fetched and the process continued at step 52 until the application program terminates.

Referring again to FIG. 4, the flow of the application program for predicated instructions is also identical to that discussed in conjunction with the flow of an application program including speculatively scheduled instructions. Here, the test instruction execution cycle N+1 88' begins the semaphore test instructions for a predicated instruction as will be discussed in conjunction with FIG. 9. The methods discussed in conjunction with FIG. 6 which describe the steps followed to associate a semaphore with a speculative instruction as well as the steps followed to clear the semaphore register are also identical whether the instructions are predicated or speculatively scheduled.

Figure 8:
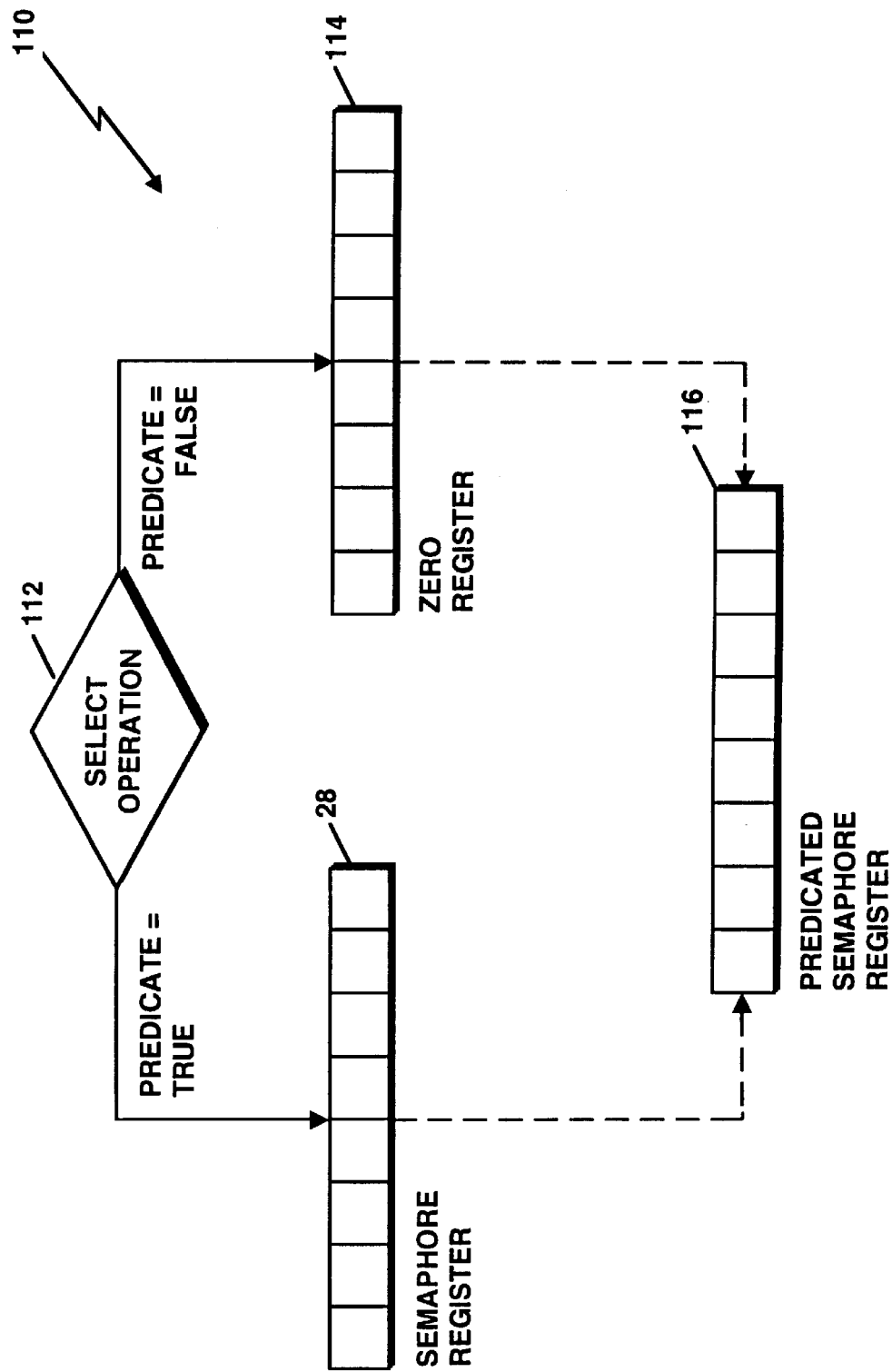
FIG. 8 is a diagram of the operation of the "select" operation used to test a semaphore associated with a predicated instruction.

Referring now to FIG. 8, compiler 20 (FIG. 1) inserts a group of instructions into the executable version of the application program 32 (FIG. 1) at the commit point of a predicated instruction in order to test the semaphore associated with the instruction. To determine the commit point of a predicated instruction, the compiler 20 must determine the point within the program at which the value of the predicate associated with the eliminated branch will be known. At this point, the compiler inserts instructions which will test a semaphore bit such as bit 28a (FIG. 2) which is associated with the predicated instruction.

Specifically, the compiler 20 inserts a "select" operation into the executable. On some computer architectures, this "select" operation is provided by a two instruction combination of a MOVE instruction, which copies a first source register into a target register, followed by a conditional move, CMOVE, which may move the contents of a second source register into the target register based upon the value of a predicate. Here, the "select" operation chooses between the semaphore register and a register filled with zeros, the zero register.

Here, the semaphore test instructions for a predicated instruction copy the contents of the semaphore register 28 or the contents of a zero register 114 into a predicated semaphore register 116 based upon the value of the predicate from the eliminated branch as shown in flow 110. At step 112, the "select" instruction is performed.

A "true" predicate value will copy the contents of the semaphore register 28 into the predicated semaphore register 116. This verifies that the predicated instruction was not "mispredicted" and that any exceptions caused by the execution of the predicated instruction should be reported.

If the predicate is "false" however, the contents of the zero register 114 are copied into the predicated semaphore register 116. This verifies that the predicated instruction was "mispredicted" and thus ignores any exceptions caused by "mispredicted" predicated instructions.

Figure 9:
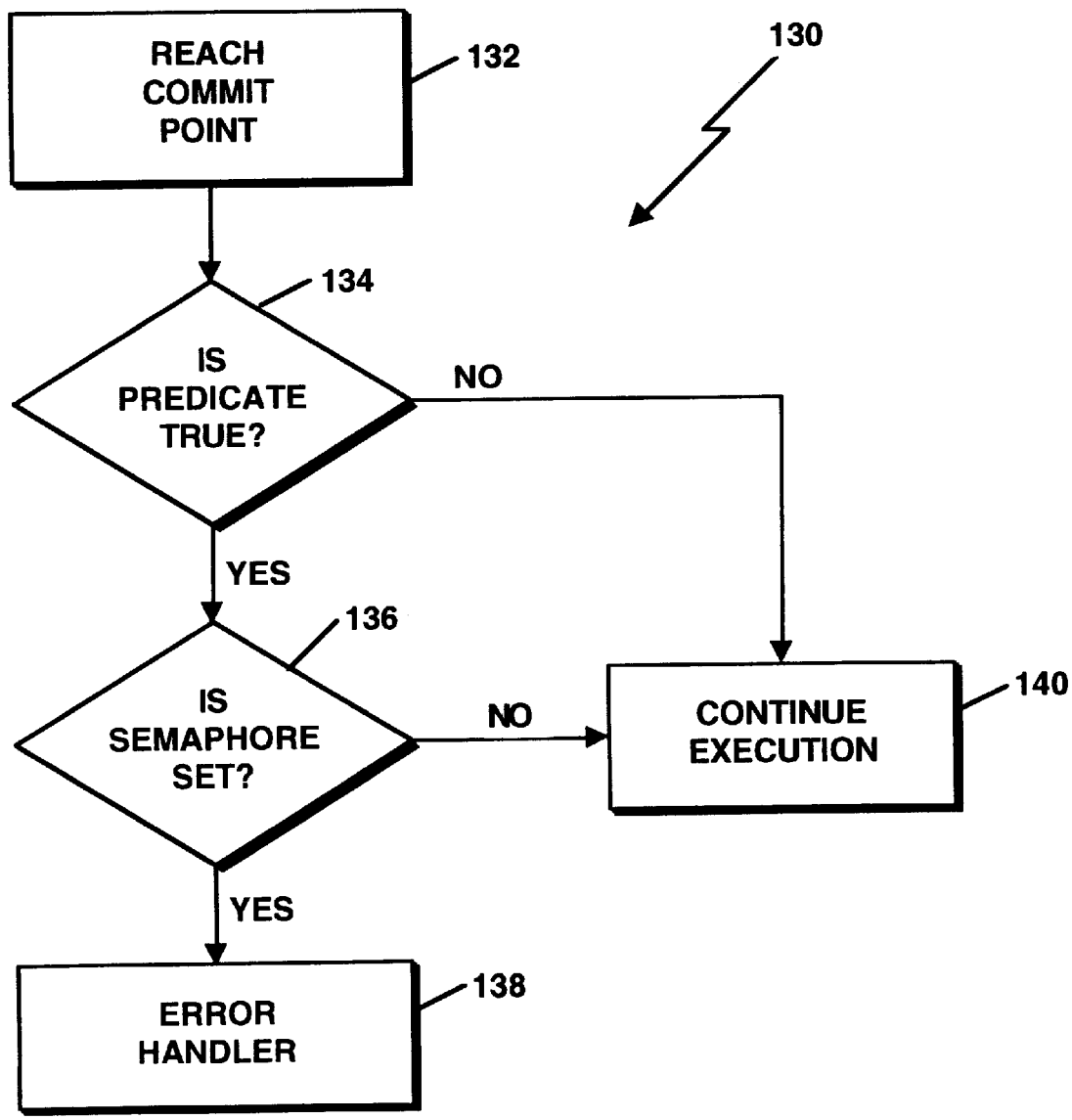
FIG. 9 is a flow chart depicting the steps taken by a run-time system following a commit point of the predicate of a predicated instruction.

Referring now to FIG. 9, once the commit point of the predicate of a predicated instruction has been reached by the run-time system at step 132, the semaphore may be tested as shown in flow 130 to determine whether any exceptions occurred when the instruction was executed.

The test instructions inserted by the compiler 20 (FIG. 1) after the commit point require that the predicate be checked at step 134 as well as the semaphore bit at step 136 before any exceptions are raised. If both the predicate is true at step 134 and the semaphore is set at step 136 then control is passed to the error handler at step 138.

If, however, either the predicate is not true at step 134, or the semaphore is not set at step 136 then the normal flow of the program is continued at step 140. A false predicate value at step 134 signifies that the predicated instruction was "mispredicted" and therefore the contents of the semaphore should be ignored. If, at step 136 the semaphore is not set when checked, this signifies that the predicated instruction did not cause an exception when executed.

It should be noted that although upon detection of exceptions caused by speculatively scheduled instructions a branch to an error handler was described, other arrangements could be provided. For example, resuming processing at the point of the exception by keeping track of the path used to reach the commit point of the speculatively scheduled instruction, or re-execute only those instructions which are dependent on the speculatively scheduled instruction.

Having described preferred embodiments of the invention, it will now become apparent to those of skill in the art that other embodiments incorporating its concepts may be provided. It is felt therefore that this invention should not be limited to the disclosed embodiments but rather should be limited only by the spirit and scope of the appended claims.

What is claimed is:

1. A computer language translator which eliminates conditional branches in a computer program including:

means for translating a program into a target language;

means for eliminating a conditional branch instruction by replacing an instruction dependent on said conditional branch instruction with a combination of a predicated instruction and a speculative instruction wherein said predicated instruction is dependent on a branch predicate of said conditional branch instruction; and means for associating a semaphore with said speculative instruction.

2. The translator of claim 1 further including:

means for including in an executable image of said program instructions to test said semaphore and to test said branch predicate.

3. The translator of claim 2 wherein said instructions to test said semaphore and to test said branch predicate include:

a conditional move instruction wherein said conditional move instruction conditionally moves said semaphore dependent on said branch predicate.

4. The translator of claim 2 wherein said instructions to test said semaphore and to test said branch predicate include:

a conditional move instruction wherein said conditional move instruction conditionally moves said branch predicate dependent on said semaphore.

5. The translator of claim 2 wherein said translator includes:

means for including in an executable image of said program instructions to report an exception if said test of said semaphore indicates an exception occurred when said speculative instruction was executed and said test of said branch predicate indicates that said speculative instruction should have executed.

6. The translator of claim 1 further including:

means for including in an executable image of said program instructions to initialize said semaphore prior to executing said speculative instruction.

7. The translator of claim 1 wherein said semaphore is represented as a pattern of at least one bit in a general register.

8. The translator of claim 1 wherein said means for associating further comprises:

means for including in an executable image of said program a data structure which maps said speculative instruction to said semaphore.

* * * * *